(12) United States Patent
Sakuma et al.

(10) Patent No.: US 10,682,982 B2
(45) Date of Patent: Jun. 16, 2020

(54) SYSTEM AND VEHICLE FOR PROVIDING IMAGES OF THE VEHICLE RELATING TO AN ABNORMAL OCCURRENCE

(71) Applicant: TOYOTA JIDOSHA KABUSHIKI KAISHA, Toyota-shi, Aichi-ken (JP)

(72) Inventors: Satoru Sakuma, Nagakute (JP); Shuhei Yamamoto, Aichi-ken (JP); Munehiro Kamiya, Anjo (JP); Hideo Hasegawa, Nagoya (JP); Shinji Kurachi, Nagoya (JP); Tomoya Shimizu, Nagoya (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 16/183,207

(22) Filed: Nov. 7, 2018

(65) Prior Publication Data
US 2019/0135231 A1    May 9, 2019

(30) Foreign Application Priority Data
Nov. 9, 2017    (JP) .................. 2017-216421

(51) Int. Cl.
*B60R 25/30*     (2013.01)
*B60R 25/33*     (2013.01)
*G08G 1/00*      (2006.01)

(52) U.S. Cl.
CPC ............ *B60R 25/305* (2013.01); *B60R 25/33* (2013.01); *G08G 1/205* (2013.01)

(58) Field of Classification Search
CPC ... B60Q 9/008; B60R 25/1004; B60R 25/102; B60R 25/305; B60R 25/33; B60W 40/08;
(Continued)

(56) References Cited

U.S. PATENT DOCUMENTS

| 2008/0165252 A1* | 7/2008 | Kamimura ............. H04N 7/181 348/155 |
| 2011/0246051 A1* | 10/2011 | Vang .................... G08G 1/0962 701/117 |

(Continued)

FOREIGN PATENT DOCUMENTS

JP    2003-123168 A    4/2003

*Primary Examiner* — Stephen R Burgdorf
(74) *Attorney, Agent, or Firm* — Hunton Andrews Kurth LLP (57) ABSTRACT

A server causes a storage to store identification information of a vehicle and a position of the vehicle as a set of information; specifies, based on position information of an abnormality occurring vehicle which is a vehicle that has transmitted abnormality occurrence information to the server, an image-shooting instructed vehicle which is a vehicle that can shoot an image of the abnormality occurring vehicle with a camera, using position information stored in the storage, without causing activation of a vehicular alarm; transmits, to the image-shooting instructed vehicle, an instruction to shoot the image of the abnormality occurring vehicle with the camera mounted in the image-shooting instructed vehicle; and transmits the image shot by the image-shooting instructed vehicle to a mobile terminal of a user of the abnormality occurring vehicle, as a description of an abnormality occurring in the abnormality occurring vehicle.

4 Claims, 6 Drawing Sheets

(58) Field of Classification Search
CPC ....... B60W 50/14; G07C 5/008; G08B 25/10;
G08G 1/0175; G08G 1/096716; G08G
1/096775; G08G 1/205; H04N 5/77;
H04N 7/18; H04N 7/183; H04N 17/004
USPC .................................................... 340/426.18
See application file for complete search history.

(56) References Cited

U.S. PATENT DOCUMENTS

| | | | | |
|---|---|---|---|---|
| 2014/0300492 A1* | 10/2014 | Watanabe | ............... | G08B 13/00 340/901 |
| 2014/0350854 A1* | 11/2014 | Sugimoto | .......... | G01C 21/3602 701/537 |
| 2015/0170505 A1* | 6/2015 | Frew | ....................... | G08B 25/10 340/539.22 |
| 2015/0195518 A1* | 7/2015 | Shikii | ................. | B60R 25/1006 348/148 |
| 2015/0287326 A1* | 10/2015 | Weller | ................... | G08G 1/168 348/148 |

* cited by examiner

| RECEPTION DATE AND TIME | VEHICLE ID | POSITION |
|---|---|---|
| a (MONTH), b (DAY), c (HOUR), d (MINUTE) | 12345678 | A PREFECTURE, B CITY, C TOWN, m, n |
| e (MONTH), f (DAY), g (HOUR), h (MINUTE) | 23456789 | D PREFECTURE, E CITY, F TOWN, p, q |
| i (MONTH), j (DAY), k (HOUR), l (MINUTE) | 34567890 | G PREFECTURE, H CITY, J TOWN, r, s |
| ⋮ | ⋮ | ⋮ |

SYSTEM AND VEHICLE FOR PROVIDING IMAGES OF THE VEHICLE RELATING TO AN ABNORMAL OCCURRENCE

This nonprovisional application is based on Japanese Patent Application No. 2017-216421 filed on Nov. 9, 2017 with the Japan Patent Office, the entire contents of which are hereby incorporated by reference.

BACKGROUND

Field

The present disclosure relates to an information providing system and a vehicle, and in particular to an information providing system and a vehicle suitable for notifying an abnormal action on the vehicle.

Description of the Background Art

When a vehicular theft sensing function is based on vibration, erroneous sensing may be made due to vibration of large fireworks set off in a fireworks display or the like. Japanese Patent Laying-Open No. 2003-123168 discloses a technique in a vehicular security control system that can improve an antitheft function without causing trouble to the surroundings due to erroneous detection.

In the above system, a time when a security function is ON or a region where the security function is ON is set beforehand, and execution of security control is limited or prohibited at a time or a region other than the set time or position. This can prevent activation of an alarm even when erroneous sensing as a theft-related abnormality is made, and prevent causing trouble to the surroundings due to the erroneous sensing.

SUMMARY

However, in the above system, if erroneous sensing as a theft-related abnormality is made at the time when the security function is ON or at the region where the security function is ON, an alarm may be activated, causing trouble to the surroundings.

An object of the present disclosure is to provide an information providing system and a vehicle that can prevent erroneously determining that an abnormality occurs in the vehicle.

An information providing system in accordance with the present disclosure includes a plurality of vehicles, a mobile terminal of a user of one of the plurality of vehicles, and a server configured to communicate with the plurality of vehicles and the mobile terminal. The server includes a controller and a storage.

The controller is configured to cause the storage to store identification information of each vehicle and a position of each vehicle as a set of information. The controller is configured to specify, based on position information of an abnormality occurring vehicle which is a vehicle that has transmitted abnormality occurrence information to the server, an image-shooting instructed vehicle which is a vehicle that can shoot an image of the abnormality occurring vehicle with a camera, using position information stored in the storage, without causing activation of a vehicular alarm, and transmit, to the image-shooting instructed vehicle, an instruction to shoot the image of the abnormality occurring vehicle with the camera mounted in the image-shooting instructed vehicle. The controller is configured to transmit the image shot by the image-shooting instructed vehicle to the mobile terminal of the user of the abnormality occurring vehicle, as a description of an abnormality occurring in the abnormality occurring vehicle.

With such a configuration, when an abnormality occurs in the vehicle of the user, an image of the vehicle shot when the abnormality occurs is transmitted to the mobile terminal of the user, as a description of the abnormality occurring in the vehicle. By observing this image, the user can determine whether or not the occurrence of the abnormality in the vehicle is erroneous information. As a result, an information providing system that can prevent erroneously determining that an abnormality occurs in a vehicle can be provided.

Preferably, when the controller receives the abnormality occurrence information from at least one of other vehicles within a predetermined range of the plurality of vehicles, the controller is configured to transmit such a fact, in addition to the image, to the mobile terminal of the user of the abnormality occurring vehicle.

With such a configuration, the user is notified of occurrence of abnormalities from the plurality of vehicles within the predetermined range from the vehicle of the user. Thus, when a plurality of similar abnormalities occur within the predetermined range, the user can consider the possibility of erroneous sensing due to vibration over a wide range resulting from fireworks in a fireworks display or the like. As a result, it is possible to further prevent erroneously determining that an abnormality occurs in the vehicle.

Preferably, the controller is configured to retrieve information indicating occurrence of a predetermined phenomenon which is statistically highly likely to be erroneously determined that an abnormality occurs, when compared with other phenomena, and transmit, to the mobile terminal of the user of the abnormality occurring vehicle parked within a range in which the retrieved predetermined phenomenon causes an erroneous determination that the abnormality occurs, a fact that there is a high likelihood of an erroneous determination, in addition to the image.

With such a configuration, the user is notified of the fact that there occurs the predetermined phenomenon which is highly likely to be erroneously determined that an abnormality occurs, within the range in which the phenomenon has influence on the vehicle. As a result, it is possible to further prevent erroneously determining that an abnormality occurs in the vehicle.

Preferably, the controller is configured to transmit, to the mobile terminal of the user of the abnormality occurring vehicle, a surrounding image shot by the abnormality occurring vehicle, in addition to the image shot by the image-shooting instructed vehicle.

With such a configuration, the user is notified of the surrounding image of the vehicle of the user when it is considered that an abnormality occurs. As a result, it is possible to further prevent erroneously determining that an abnormality occurs in the vehicle.

A vehicle in accordance with another aspect of the present disclosure includes a position detector configured to detect a position of the vehicle, an action detector configured to detect an action on the vehicle, a camera configured to shoot an image around the vehicle, and a controller. The controller is configured to transmit position information of the vehicle detected by the position detector and identification information of the vehicle to a server to be stored therein. The controller is configured to determine whether or not the action detected by the action detector is an abnormal action that meets a predetermined condition. When determining that the action is the abnormal action, the controller is configured to transmit abnormality occurrence information including a position of the vehicle detected by the position detector to the server, without causing activation of an alarm. The controller is configured to control the camera to shoot an image of an abnormality occurring vehicle which is a vehicle that has transmitted the abnormality occurrence information to the server, according to an image-shooting instruction from the server to the vehicle determined that the vehicle can shoot the image of the abnormality occurring vehicle with the camera, using the position information stored in the server, based on position information of the abnormality occurring vehicle. The controller is configured to transmit the shot image to the server to transmit the image to a mobile terminal of a user of the abnormality occurring vehicle, as a description of an abnormality occurring in the abnormality occurring vehicle.

With such a configuration, a vehicle that can prevent erroneously determining that an abnormality occurs in the vehicle can be provided.

The foregoing and other objects, features, aspects and advantages of the present disclosure will become more apparent from the following detailed description of the present disclosure when taken in conjunction with the accompanying drawings.

DESCRIPTION OF THE PREFERRED EMBODIMENTS

Hereinafter, an embodiment of the present disclosure will be described in detail with reference to the drawings. It should be noted that identical or corresponding parts in the drawings will be designated by the same reference numerals, and the description thereof will not be repeated.

Figure 1:
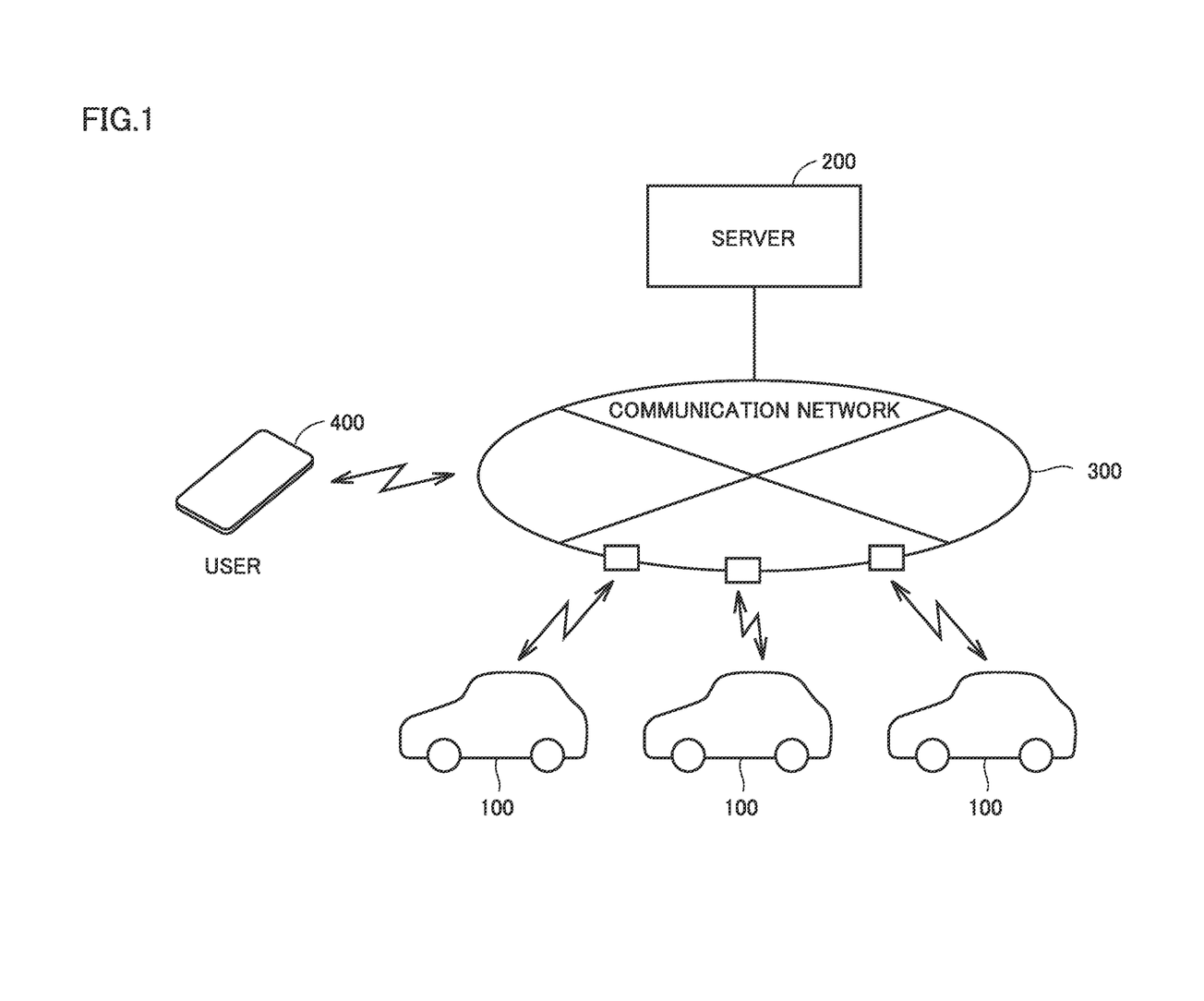
FIG. 1 is a view schematically showing an entire configuration of an abnormal action information providing system according to the present embodiment.

FIG. 1 is a schematic view of an entire configuration of an abnormal action information providing system 10 according to the present embodiment. Referring to FIG. 1, abnormal action information providing system 10 includes a plurality of vehicles 100, a server 200, and a mobile terminal 400. Vehicles 100 and server 200, and mobile terminal 400 and server 200 are configured to communicate with each other via a communication network 300 such as the Internet or a telephone line. Each vehicle 100 and each mobile terminal 400 are configured to transmit and receive information to and from communication network 300 by wireless communication.

As described below, based on information from each vehicle 100, abnormal action information providing system 10 provides information on an abnormal action on vehicle 100 to another vehicle 100 or mobile terminal 400. In the present embodiment, types of the abnormal action include vehicle theft, theft from a vehicle, and mischief to vehicle 100.

Since it is desirable for vehicle 100 in the present embodiment to monitor surrounding circumstances and circumstances inside the vehicle with a vehicle-mounted camera 170 and various sensors even while it is parked, it consumes electric power even while it is parked. Accordingly, vehicle 100 in the present embodiment is preferably a vehicle equipped with a large-capacity power storage device. For example, if vehicle 100 is an electric vehicle, such a vehicle is equipped with a power storage device having a larger capacity when compared with a case where vehicle 100 is not an electric vehicle. Therefore, even when vehicle 100 always monitors the surroundings with vehicle-mounted camera 170 and the various sensors even while it is parked, such monitoring does not have a considerable influence on the SOC (State of Charge) of the power storage device, when compared with a case where vehicle 100 is not equipped with a large-capacity power storage device.

Figure 2:
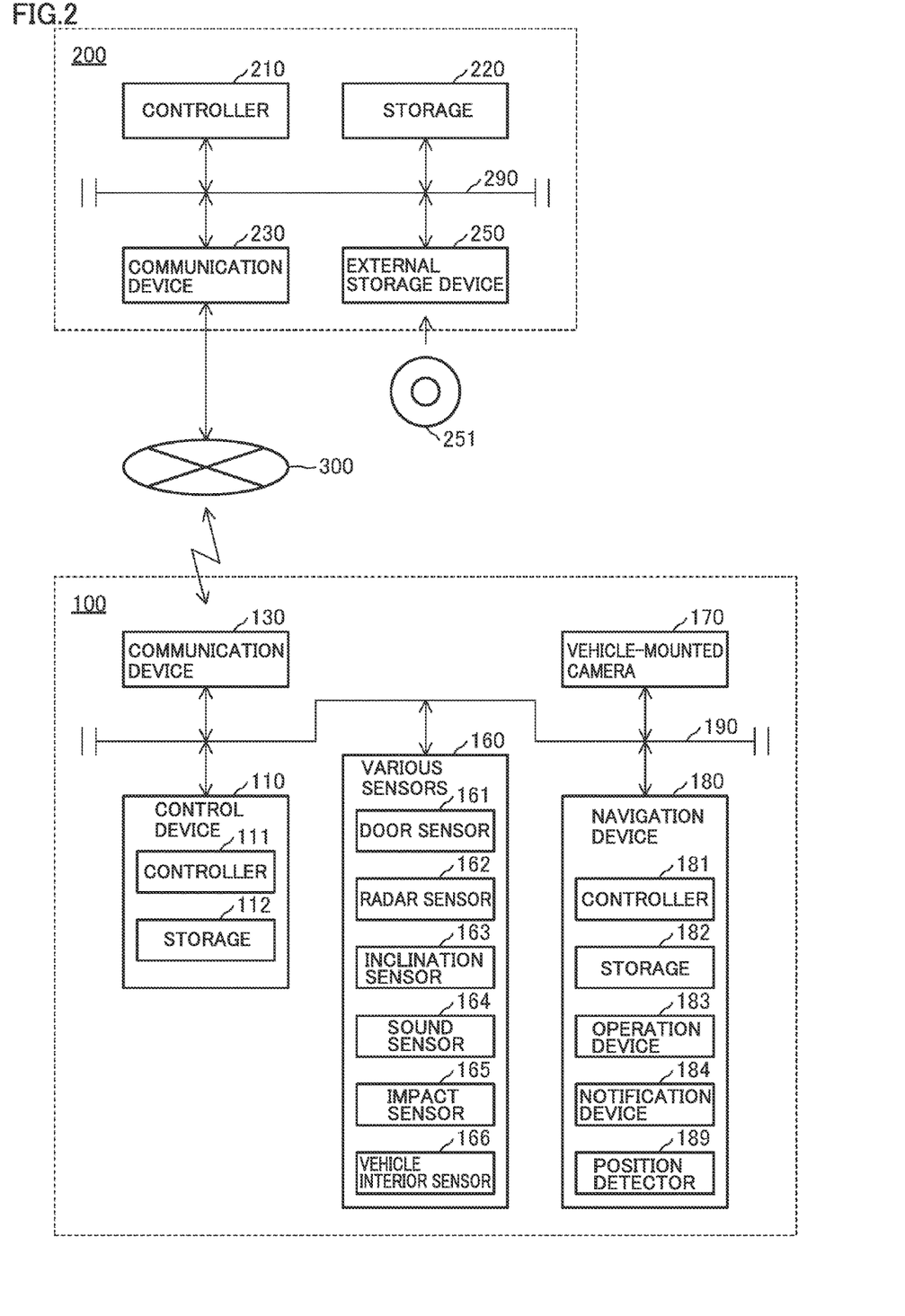
FIG. 2 is a block diagram for illustrating a configuration of a vehicle and a server.

FIG. 2 is a block diagram for illustrating a configuration of each vehicle and the server. Referring to FIG. 2, vehicle 100 includes a control device 110, a communication device 130, various sensors 160, vehicle-mounted camera 170, and a navigation device 180. Control device 110, communication device 130, various sensors 160, vehicle-mounted camera 170, and navigation device 180 are connected with each other through a wired, vehicle-mounted network 190 such as a CAN (Controller Area Network).

Communication device 130 transmits and receives data to and from an external device (for example, server 200) via communication network 300, using a predetermined protocol. Communication device 130 transmits data received from a device connected to vehicle-mounted network 190, such as control device 110, to the outside, or passes data received from the outside to a device connected to vehicle-mounted network 190, such as control device 110.

Various sensors 160 sense an action on vehicle 100 by a person. Detection signals of various sensors 160 are transmitted to navigation device 180 or control device 110. Various sensors 160 include a door sensor 161, a radar sensor 162, an inclination sensor 163, a sound sensor 164, an impact sensor 165, and a vehicle interior sensor 166. Various sensors 160 may include at least one of these sensors, or may include other sensors.

Door sensor 161 senses opening/closing of doors of vehicle 100. Radar sensor 162 senses abnormal approach to vehicle 100 using an electric wave or the like. Inclination sensor 163 senses inclination of vehicle 100, stores an angle at normal time such as during parking, and, when vehicle 100 is inclined by a predetermined angle or more from the angle at normal time, inclination sensor 163 outputs a signal indicating that vehicle 100 is inclined. Inclination sensor 163 can detect theft of a wheel and theft of vehicle 100 using a wrecker or the like.

Sound sensor 164 senses only abnormal sound in a specific frequency band, such as sound of scratching a key cylinder during picking, and high frequency sound produced when cutting glass to intrude into a vehicle. Impact sensor 165 senses impact on a vehicle body. Vehicle interior sensor 166 senses motion of a person or the like inside a vehicle using a supersonic wave, an infrared ray, or the like.

Vehicle-mounted camera 170 is a CCD (Charge Coupled Device) camera, for example, and is attached to at least one of the front, rear, right, and left of vehicle 100. Vehicle-mounted camera 170 shoots an image around vehicle 100.

Data shot with vehicle-mounted camera 170 is transmitted to navigation device 180 or control device 110.

Navigation device 180 includes a controller 181 for controlling entire navigation device 180, a storage 182 for storing predetermined information, an operation device 183 for operating navigation device 180, an notification device 184 for notifying predetermined information of navigation device 180 through display and voice, and a position detector 189 for detecting a position.

Storage 182 includes a RAM (Random Access Memory) used as a workspace necessary to execute a program by controller 181, and a ROM (Read Only Memory) for storing the program to be executed by controller 181. In addition, in the RAM, programs and data for executing predetermined processing are read from the ROM or the like and are stored. Further, a recording medium such as a memory card may be used as an auxiliary storage device for assisting a storage area of the RAM.

Operation device 183 includes a plurality of operation buttons for causing navigation device 180 to perform a predetermined function, and a touch panel formed on a display of notification device 184. An operation signal indicating operation contents input into navigation device 180 by operating the operation buttons and the touch panel of operation device 183 is passed to controller 181.

Notification device 184 includes a liquid crystal display device (hereinafter referred to as an "LCD") having the display, on which the touch panel is formed, and a speaker. The LCD of notification device 184 displays an image received from controller 181 indicating information for navigating vehicle 100 and the operation buttons of the touch panel, and the like. It should be noted that notification device 184 may include another FPD (Flat Panel Display) such as an EL (Electro-Luminescence) display, instead of an LCD. The speaker of notification device 184 outputs a voice signal received from controller 181 as voice.

Position detector 189 detects the position of the vehicle based on an electric wave from a GPS (Global Positioning System) satellite, and passes the detected position information to controller 181.

Controller 181 includes an MPU (Micro Processing Unit) and an auxiliary circuit thereof. Controller 181 controls storage 182, operation device 183, notification device 184, and position detector 189. Controller 181 performs predetermined processing according to the programs and data stored in storage 182. Controller 181 processes data input from operation device 183 or other devices connected to vehicle-mounted network 190 (for example, vehicle-mounted camera 170, control device 110, communication device 130, and the like). Controller 181 causes the processed data to be stored in storage 182, to be notified by notification device 184, or to be output to the other devices.

Specifically, controller 181 performs a variety of navigation processing for vehicle 100 using the position information (GPS information) of vehicle 100 detected by position detector 189. More specifically, controller 181 controls notification device 184 to calculate a traveling route (a scheduled traveling route or a target route) for vehicle 100 from the present location to a destination based on the GPS information of vehicle 100 and road map data stored in storage 182, display information on the target route, and output the information as voice.

Control device 110 is a so-called ECU (Electronic Control Unit), and includes a controller 111 for controlling entire vehicle 100, and a storage 112 for storing predetermined information. Storage 112 is the same as storage 182 of navigation device 180 described above, and thus an overlapped description thereof will not be repeated.

Controller 111 includes an MPU (Micro Processing Unit) and an auxiliary circuit thereof. Controller 111 performs predetermined processing according to programs and data stored in storage 112. Controller 111 processes data input from other devices connected to vehicle-mounted network 190 (for example, communication device 130, vehicle-mounted camera 170, navigation device 180, and the like). Controller 111 causes the processed data to be stored in storage 112, or to be output to the other devices.

Specifically, controller 111 controls devices such as a drive device for a motor generator in response to signals from sensors and the like of vehicle 100, such that vehicle 100 enters a desired state.

Server 200 includes a controller 210, a storage 220, a communication device 230, and an external storage device 250. Storage 220 and communication device 230 are the same as storage 112 of control device 110 and communication device 130 of vehicle 100 described above, and thus an overlapped description thereof will not be repeated.

External storage device 250 includes a storage device such as a hard disk drive, a flexible disk drive, an MO (Magneto-Optical disk) drive, a CD (Compact Disc) drive, a DVD (Digital Versatile Disk) drive, or a memory card reader writer. External storage device 250 magnetically, optically, or electrically records predetermined data or program received from controller 210 in a recording medium 251, or reads the data or program from recording medium 251 and passes it to controller 210. Examples of recording medium 251 include magnetic disks such as a hard disk and a flexible disk, optical disks such as a CD-ROM (Compact Disk Read Only Memory), a CD-R (Compact Disk Recordable), a CD-RW (Compact Disk ReWritable), a DVD-ROM (Digital Versatile Disk Read Only Memory), a DVD-R (Digital Versatile Disk Recordable), a DVD-RW (Digital Versatile Disk ReWritable), a DVD-RAM (Digital Versatile Disk Random Access Memory), a DVD+R, and a DVD+RW, magneto-optical disks such as an MO (Magneto-Optical disk), a memory card, and a USB (Universal Serial Bus) memory.

Controller 210 includes an MPU (Micro Processing Unit) and an auxiliary circuit thereof. Controller 210 controls storage 220, communication device 230, and external storage device 250. Controller 210 performs predetermined processing according to programs and data stored in storage 220. Controller 210 processes data input from communication device 230 and external storage device 250. Controller 210 causes the processed data to be stored in storage 220, to be output from communication device 230 to other devices, or to be stored in recording medium 251 of external storage device 250.

It should be noted that, although server 200 does not include an operation device and a display device in the present embodiment, the present disclosure is not limited thereto, and server 200 may include components of an operation device and a display device. The operation device includes a keyboard and a mouse, and an operation signal indicating operation contents input into server 200 by operating the keyboard and the mouse of the operation device is passed to controller 210. The display device includes an LCD, and the LCD displays an image corresponding to image data received from controller 210.

Figure 3:
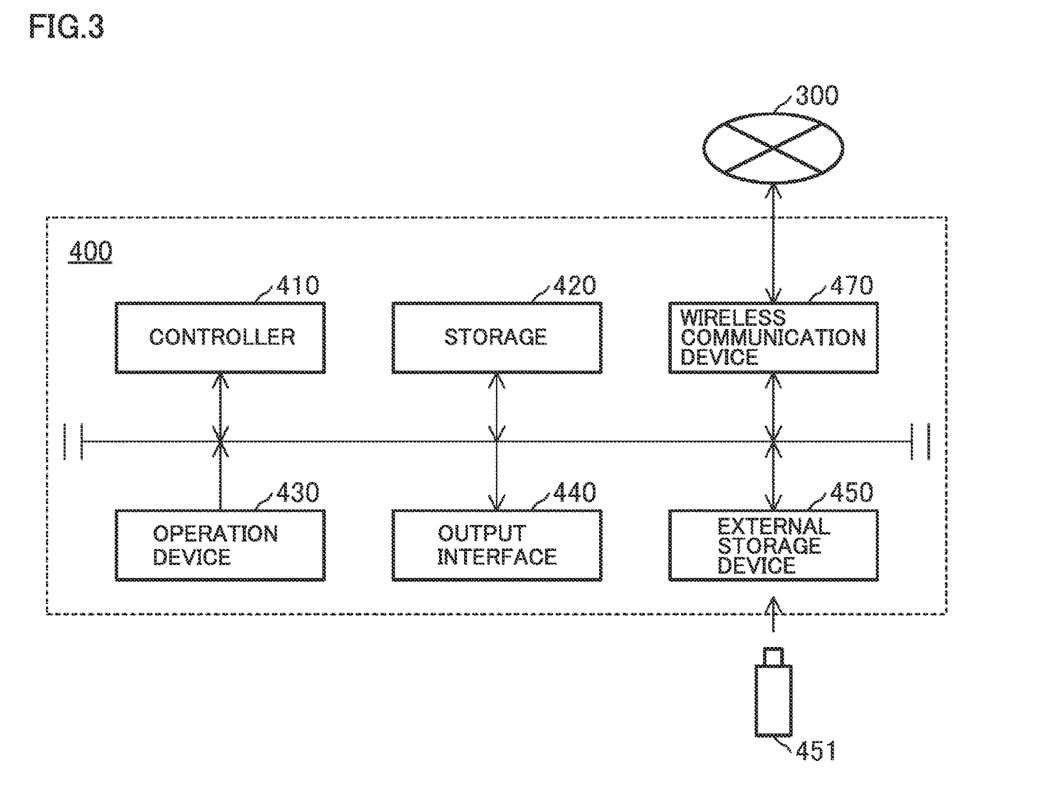
FIG. 3 is a block diagram showing a configuration of a mobile terminal in the present embodiment.

FIG. 3 is a block diagram showing a configuration of mobile terminal 400 in the present embodiment. Referring to FIG. 3, mobile terminal 400 includes a controller 410 for controlling entire mobile terminal 400, a storage 420 for storing predetermined information, an operation device 430, an output interface 440, an external storage device 450, and a wireless communication device 470. It should be noted that, although not shown, mobile terminal 400 also includes other components such as a voice input/output interface for inputting and outputting voice.

Controller 410 includes a CPU (Central Processing Unit) and an auxiliary circuit thereof. Controller 410 controls storage 420, operation device 430, output interface 440, and wireless communication device 470. Controller 410 performs predetermined processing according to programs or data stored in storage 420. Controller 410 processes data input from operation device 430 and wireless communication device 470. Controller 410 causes the processed data to be stored in storage 420, or to be output to output interface 440 and wireless communication device 470.

Storage 420 includes a RAM (Random Access Memory) used as a workspace necessary to execute a program by controller 410, and a ROM (Read Only Memory) for storing the program to be executed by controller 410. In addition, in the RAM, programs and data for executing predetermined processing are read from operation device 430, wireless communication device 470, or external storage device 450, and are stored. Further, a hard disk drive or a memory card may be used as an auxiliary storage device for assisting a storage area of the RAM.

External storage device 450 includes a memory card reader writer. External storage device 450 electrically records predetermined data or program received from controller 410 in a recording medium 451 such as a memory card or a USB (Universal Serial Bus) memory, or reads the data or program from recording medium 451 and passes it to controller 410. It should be noted that external storage device 450 may include a storage device such as a hard disk drive, a flexible disk drive, an MO (Magneto-Optical disk) drive, a CD (Compact Disc) drive, or a DVD (Digital Versatile Disk) drive.

Operation device 430 includes a touch panel and operation buttons for inputting numbers, the alphabet, other characters, and the like, of a telephone number, various types of data, and the like. It should be noted that operation device 430 may include another device for operation. As operation device 430 is operated by a user, an operation signal corresponding to the operation is transmitted from operation device 430 to controller 410. Controller 410 controls devices of mobile terminal 400 in response to the operation signal from operation device 430.

Wireless communication device 470 is controlled by controller 410 to receive a wireless signal from another mobile terminal 400 or a fixed-line telephone of a call partner, via a communication facility of a telecommunications carrier and an antenna. Wireless communication device 470 converts the received wireless signal into a voice signal, and transmits the converted voice signal to the voice input/output interface. Wireless communication device 470 converts a voice signal from the voice input/output interface into a wireless signal, and transmits the wireless signal to other mobile terminal 400 or the fixed-line telephone of the call partner, via the antenna and the communication facility of the telecommunications carrier.

Further, wireless communication device 470 is controlled by controller 410 to receive a wireless signal from an apparatus which can perform data communication, for example, server 200 or other mobile terminal 400, via the communication facility of the telecommunications carrier and the antenna. Wireless communication device 470 converts the received wireless signal into data, and stores the converted data in storage 420, or transmits the converted data to output interface 440 to display the data. Wireless communication device 470 converts data to be transmitted into a wireless signal, and transmits the wireless signal to the server or other mobile terminal 400 to which the data is to be communicated, via the antenna and the communication facility of the telecommunications carrier.

Furthermore, wireless communication device 470 is controlled by controller 410 to exchange data with other apparatuses which can perform network communication, for example, server 200 and other mobile terminal 400, via a public wireless LAN or a wireless LAN for a private network.

Output interface 440 includes a display and a speaker. Output interface 440 is controlled by controller 410 to cause an image signal and a voice signal obtained by converting information received by wireless communication device 470, information stored in storage 420, or information read from recording medium 451 in external storage device 450, by controller 410, to be displayed as an image on the display and to be output as voice from the speaker, respectively.

In a conventional system, if erroneous sensing as a theft-related abnormality is made, an alarm may be activated, causing trouble to the surroundings.

Accordingly, in the present embodiment, vehicle 100 transmits the position information of the vehicle detected by position detector 189 and identification information of the vehicle to server 200. Server 200 causes storage 220 to store the identification information and the position information of vehicle 100 which has transmitted these pieces of information, in an associated manner as a set of information.

A first vehicle 100 determines whether or not an action detected by various sensors 160 is an abnormal action that meets a predetermined condition. When first vehicle 100 determines that the action is the abnormal action, first vehicle 100 transmits, to server 200, abnormal action occurrence information including a position of the first vehicle detected by position detector 189. Server 200 determines whether or not there is a second vehicle 100 that can shoot an image of first vehicle 100 at the position included in the occurrence information received from first vehicle 100 with vehicle-mounted camera 170, using the position information stored in storage 220. When server 200 determines that there is second vehicle 100, server 200 transmits, to second vehicle 100, an instruction to shoot the image of first vehicle 100 with vehicle-mounted camera 170. According to the instruction from server 200, second vehicle 100 controls vehicle-mounted camera 170 to shoot the image of first vehicle 100, and transmits the shot image to server 200. When server 200 receives the image from second vehicle 100, server 200 transmits notice information that the abnormal action occurs in first vehicle 100, including the image, to mobile terminal 400 of a user of first vehicle 100. According to the notice information received from server 200, mobile terminal 400 controls output interface 440 to notify the image of first vehicle 100, in addition to information that the abnormal action occurs in first vehicle 100 of the user.

Thereby, when an abnormal action occurs in vehicle 100 of the user, in addition to information on such a fact, the user is notified of the image of vehicle 100 shot when the abnormal action occurs. By observing this image, the user can determine whether or not the occurrence of the abnormal action on vehicle 100 is erroneous information. As a result, it is possible to prevent erroneously determining that an abnormal action occurs in vehicle 100.

Figure 4:
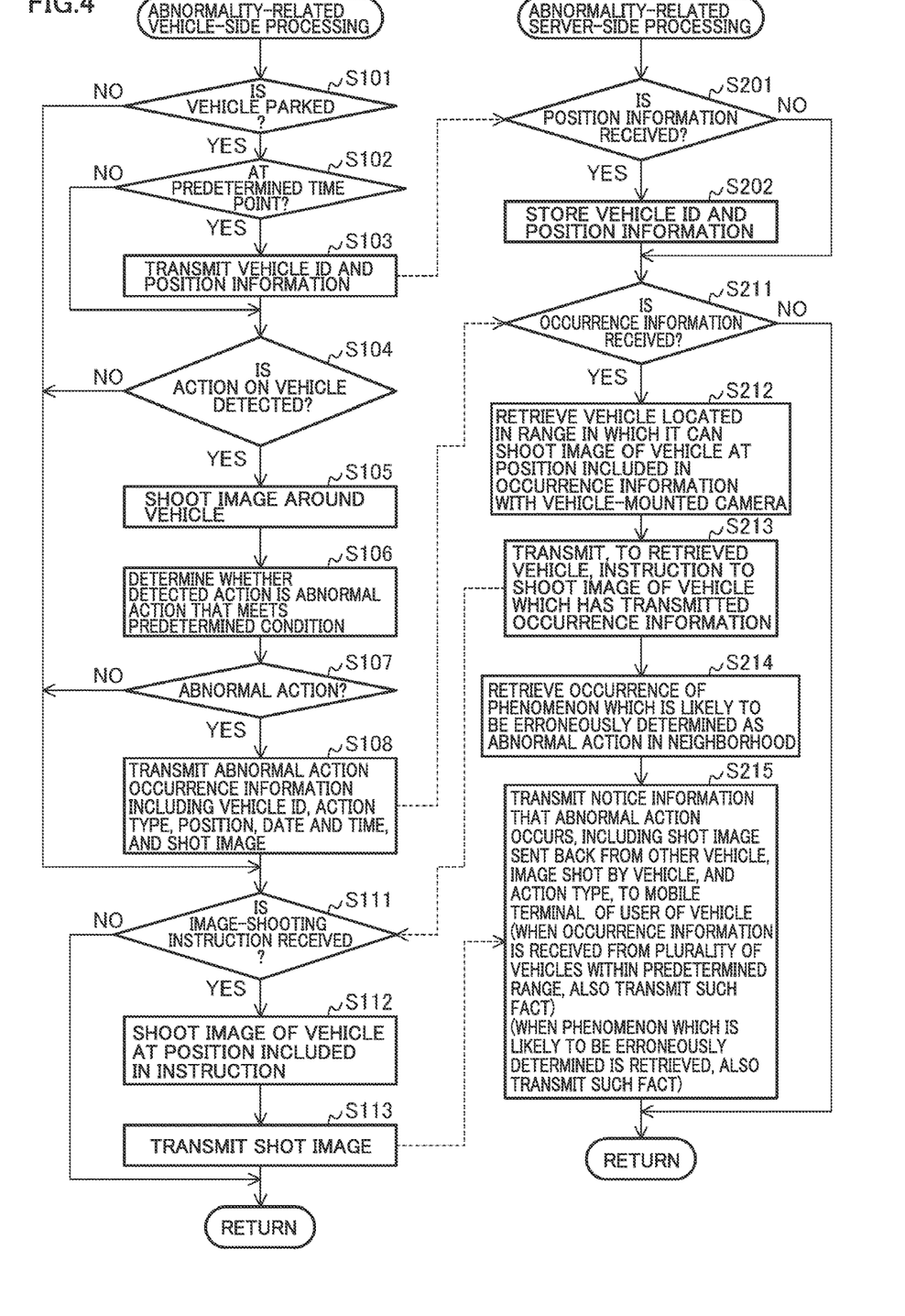
FIG. 4 is a flowchart showing a flow of abnormality-related processing performed in the present embodiment.

FIG. 4 is a flowchart showing a flow of abnormality-related processing performed in the present embodiment. Referring to FIG. 4, in vehicle 100, controller 181 of navigation device 180 determines whether or not vehicle 100 is parked (S101). Whether or not vehicle 100 is parked is determined, for example, based on whether or not a vehicle system is set to an ON state (a state where electric power is supplied to each component of vehicle 100 shown in FIG. 2 and thereby the system is operable). It should be noted that whether or not vehicle 100 is parked may be determined by any other method, and for example may be determined based on that the vehicle system is not set to an ON state, and whether or not doors of vehicle 100 are locked. When controller 181 determines that vehicle 100 is not parked (NO in S101), controller 181 proceeds the processing to be performed to S111.

On the other hand, when controller 181 determines that vehicle 100 is parked (YES in S101), controller 181 determines whether or not a predetermined time point is reached (the predetermined time point is, for example, timing with a predetermined interval (every 10 minutes), or when there is a request from server 200) (S102). When controller 181 determines that the predetermined time point is reached (YES in S102), controller 181 transmits a vehicle ID for uniquely identifying vehicle 100 stored beforehand in storage 112 of control device 110, and the position information of vehicle 100 detected by position detector 189, to server 200 (S103).

In server 200, controller 210 determines whether or not the position information is received from vehicle 100 (S201). When controller 210 determines that the position information is received (YES in S201), controller 210 causes storage 220 to store reception date and time, the vehicle ID, and the position information, in an associated manner as a set of information (S202).

Figure 5:
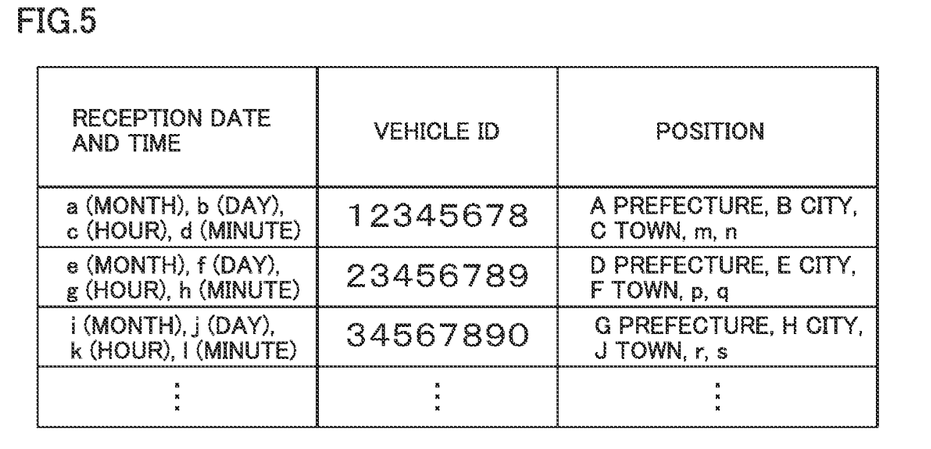
FIG. 5 is a view for illustrating vehicle position information stored in the server in the present embodiment.

FIG. 5 is a view for illustrating vehicle position information stored in server 200 in the present embodiment. Referring to FIG. 5, in S202 of FIG. 4, reception date and time, a vehicle ID, and position information are stored in storage 220 in an associated manner as a set of information. It should be noted that, although each position information is indicated here as a location, each position information is not limited thereto as long as it is information that can specify the position of vehicle 100, and may be a longitude/latitude at which vehicle 100 is located, for example.

Turning back to FIG. 4, when controller 210 determines that the position information is not received (NO in S201) and after S202, controller 210 proceeds the processing to be performed to S211.

When controller 181 determines that the predetermined time point is not reached (NO in S102) and after S103, and when a monitoring mode is set while vehicle 100 is parked, controller 181 of navigation device 180 of vehicle 100 receives the detection signals from various sensors 160. Thereby, controller 181 determines whether or not an action on vehicle 100 due to an act by a person (for example, vehicle theft, theft from a vehicle, and mischief to a vehicle), a natural phenomenon (for example, vibration or sound of a thunder or an earthquake), an artificial phenomenon (for example, vibration or sound of a fireworks display or an outdoor concert), or the like is detected (S104). The monitoring mode is a mode for monitoring an abnormal act on vehicle 100, and becomes valid upon a user switching the mode to a valid state when the user parks vehicle 100 and leaves vehicle 100. When controller 181 determines that an action on vehicle 100 is not detected (NO in S104), controller 181 proceeds the processing to be performed to S111.

On the other hand, when controller 181 determines that an action on vehicle 100 is detected (YES in S104), controller 181 controls vehicle-mounted camera 170 to shoot an image around vehicle 100 (S105). Then, controller 181 determines whether or not the detected action is an abnormal action that meets a predetermined condition (S106).

For example, when a condition that radar sensor 162 senses approach of a person or a like, and then sound sensor 164 senses abnormal sound or impact sensor 165 senses impact on the vehicle body, as a predetermined condition, is met, controller 181 determines that mischief to vehicle 100 occurs as an abnormal action. Thus, when the predetermined condition is met in a case where there is no intrusion into the vehicle and there is no movement of vehicle 100, controller 181 determines that mischief to vehicle 100 occurs.

Further, when a condition that radar sensor 162 senses approach of a person or a like, and then sound sensor 164 senses abnormal sound or door sensor 161 senses opening/closing of a door or impact sensor 165 senses impact on the vehicle body, and thereafter vehicle interior sensor 166 senses motion of the person or the like inside the vehicle, as a predetermined condition, is met, controller 181 determines that theft from the vehicle occurs as an abnormal action. Thus, when the predetermined condition is met in a case where there is intrusion into the vehicle and there is no movement of vehicle 100, controller 181 determines that theft from the vehicle occurs in vehicle 100.

Furthermore, when a condition that radar sensor 162 senses approach of a person or a like, and then inclination sensor 163 senses inclination of vehicle 100, as a predetermined condition, is met, controller 181 determines that theft of a component on the outside of vehicle 100 (for example, a wheel, a tire, or the like), which is one type of theft from the vehicle, occurs as an abnormal action. Thus, when the predetermined condition is met in a case where there is no intrusion into the vehicle and there is no movement of vehicle 100, controller 181 determines that theft of a component on the outside of vehicle 100 occurs in vehicle 100.

In addition, when a condition that radar sensor 162 senses approach of a person or a like, and then position detector 189 detects movement of vehicle 100, as a predetermined condition, is met, controller 181 determines that vehicle theft occurs as an abnormal action. Thus, when the predetermined condition is met in a case where there is movement of vehicle 100, controller 181 determines that vehicle theft occurs.

Further, when a condition that, although radar sensor 162 does not sense approach of a person or a like, sound sensor 164 senses abnormal sound or impact sensor 165 senses impact on the vehicle body, as a predetermined condition, is met, controller 181 determines that an abnormal action of an unknown cause occurs.

It should be noted that the predetermined condition for an abnormal action may be any other condition as long as it is a condition for determining whether an action is abnormal. For example, when a condition that controller 181 determines from an image shot with vehicle-mounted camera 170 that there is an act that a person is looking into vehicle 100 from a distance undetectable by radar sensor 162, as a predetermined condition, is met, controller 181 may determine that an abnormal action occurs, although such an action is at a stage prior to an abnormal action. In addition, the types of the abnormal action may include any other type as long as it is a type for distinguishing an abnormal action.

Subsequently, controller 181 determines whether or not the abnormal action occurs (S107). It should be noted that, when door sensor 161 senses opening/closing of a door and then the monitoring mode is switched from a valid state to an invalid state within a predetermined time (for example, a time of about 10 to 30 seconds; the predetermined time may be configured to be set by the user), controller 181 may be configured not to determine that the abnormal action occurs in S107. When controller 181 determines that the abnormal action does not occur (NO in S107), controller 181 proceeds the processing to be performed to S111.

When controller 181 determines that the abnormal action occurs (YES in S107), controller 181 transmits, to server 200, occurrence information that the abnormal action occurs, including the vehicle ID of vehicle 100, the type of the occurring abnormal action, the position of the vehicle, the current date and time, and the image shot in S105 (S108). The position of the vehicle is obtained from position detector 189 of navigation device 180. Thereafter, controller 181 proceeds the processing to be performed to S111.

It should be noted that, although not shown in FIG. 4, when it is determined in S107 that the abnormal action occurs, an alarm is prevented from being sounded. It should be noted that an alarm may be sounded.

In server 200, controller 210 determines whether or not the occurrence information is received from vehicle 100 (S211). When controller 210 determines that the occurrence information is not received (NO in S211), controller 210 proceeds the processing to a caller of this processing.

On the other hand, when controller 210 determines that the occurrence information is received (YES in S211), controller 210 retrieves another vehicle 100 located in a range in which it can shoot an image of vehicle 100 at the position included in the received occurrence information with vehicle-mounted camera 170, from combinations of the vehicle ID and the position information stored in storage 220 (S212). A range for retrieval is limited to a range in which the reception date and time stored in storage 220 is within a predetermined time (for example, 24 hours) from the current date and time. However, the range for retrieval is not limited thereto. The range for retrieval may be another range, and may be a range in which the reception date and time is within one month from the current date and time.

Subsequently, if controller 210 retrieves other vehicle 100, controller 210 transmits, to other vehicle 100, an instruction to shoot the image of vehicle 100 which has transmitted the occurrence information, including the position information of vehicle 100 (S213).

In other vehicle 100, controller 181 of navigation device 180 determines whether or not the image-shooting instruction is received from server 200 (S111). When controller 181 determines that the image-shooting instruction is not received (NO in S111), controller 181 proceeds the processing to be performed to a caller of this processing.

On the other hand, when controller 181 of navigation device 180 of other vehicle 100 determines that the image-shooting instruction is received (YES in S111), controller 181 controls vehicle-mounted camera 170 to shoot the image of vehicle 100 having the position information included in the image-shooting instruction (S112). Subsequently, controller 181 transmits the shot image to server 200 (S113). Thereafter, controller 181 proceeds the processing to be performed to the caller of this processing.

In server 200, controller 210 retrieves, from the Internet, occurrence of a phenomenon which is statistically significantly highly likely to be erroneously determined as an abnormal action on vehicle 100 in the neighborhood of the position included in the occurrence information, when compared with other phenomena (S214). Such a phenomenon which is statistically significantly highly likely to be erroneously determined as an abnormal action when compared with other phenomena is specified by investigating whether an erroneous determination occurs regarding the phenomenon, and performing calculation based on the result of the investigation using a statistically well-known method. For example, a phenomenon to be retrieved is a phenomenon which may be detected by various sensors 160 (for example, sound sensor 164, impact sensor 165, and the like) of vehicle 100, such as a fireworks display and an outdoor concert held on the date and time included in the occurrence information in the neighborhood of the position of vehicle 100, and a thunder and an earthquake occurring on the date and time included in the occurrence information in the neighborhood of the position of vehicle 100.

Next, controller 210 transmits notice information that the abnormal action occurs, including the shot image sent back from other vehicle 100, and the image shot by vehicle 100 and the action type included in the occurrence information received in S211, to a mail address of mobile terminal 400 of the user of vehicle 100 (S215). It should be noted that it is only necessary to transmit at least the shot image sent back from other vehicle 100, as a description of an abnormality occurring in vehicle 100, and the information to be transmitted may include another information. In user registration processing when an application program for the abnormality-related vehicle-side processing is incorporated into navigation device 180 of vehicle 100, the vehicle ID of vehicle 100 and the mail address of mobile terminal 400 of the user of vehicle 100 are stored beforehand in storage 220 of server 200, in an associated manner as a set of information.

In addition, when controller 210 receives the occurrence information from a plurality of vehicles 100 within a predetermined range in which erroneous determination may be made due to the same phenomenon, controller 210 also transmits such a fact to mobile terminal 400. The predetermined range may be, for example, a range having a predetermined radius (for example, 1 km) from vehicle 100, or a range predefined as a range in which the phenomenon retrieved in S214 may affect various sensors 160 of vehicle 100 (for example, if the phenomenon is a fireworks display, a range of 1 km from the site of the fireworks display, and if the phenomenon is an earthquake, a range with a seismic intensity of 3 or more).

Further, when a phenomenon which is likely to be erroneously determined is retrieved in S214, controller 210 also transmits the phenomenon to mobile terminal 400.

It should be noted that, although the notice information is transmitted here by e-mail, the present disclosure is not limited thereto. An application program for receiving a push notification from server 200 may be incorporated into mobile terminal 400 in the user registration processing, and a push notification of the notice information may be received from server 200 according to this application program.

Figure 6:
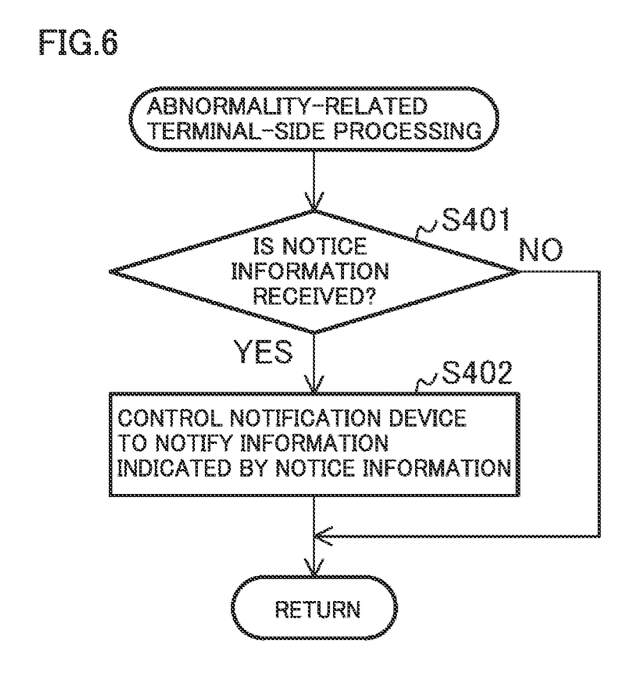
FIG. 6 is a flowchart showing a flow of abnormality-related terminal-side processing performed in the present embodiment.

FIG. 6 is a flowchart showing a flow of abnormality-related terminal-side processing performed in the present embodiment. Referring to FIG. 6, in mobile terminal 400, controller 410 determines whether or not the notice information is received from server 200 (S401). When controller 410 determines that the notice information is received (YES in S401), controller 410 controls output interface 440 to notify information indicated by the received notice information (S402).

Specifically, for example, an image showing that there is a suspicious person around the vehicle as the image shot by the other vehicle, an image showing that there is a person doing something to the vehicle as the image shot by the vehicle, and the fact that vehicle theft, theft from the vehicle, or mischief to vehicle 100 as the action type occurs are displayed on the display of output interface 440 of mobile terminal 400.

By observing these pieces of information, the user can learn that the abnormal act on vehicle 100 is not an erroneous determination but actually occurs.

Alternatively, an image showing that there occurs no abnormality around the vehicle as the image shot by the other vehicle, an image showing that there is no person in the vicinity of the vehicle as the image shot by the vehicle, and the fact that an abnormal action of an unknown cause occurs are displayed on the display of output interface 440 of mobile terminal 400.

By observing these pieces of information, the user can learn that the abnormal action on vehicle 100 is an erroneous determination and there is a high possibility that no abnormality occurs.

If vehicle 100 is configured to sound an alarm in response to occurrence of an abnormal action on vehicle 100 in such a case, vehicle 100 may be configured such that, when the user determines that the occurrence of the abnormal action is an erroneous determination, the user can stop sounding of the alarm in vehicle 100 from mobile terminal 400 (for example, via server 200).

Specifically, a program for remotely operating the alarm in vehicle 100 is included in the above application program incorporated into mobile terminal 400. When the program accepts an operation by the user to stop sounding of the alarm, a stop control signal is transmitted to vehicle 100 via server 200. Then, sounding of the alarm may be stopped by controller 181 of navigation device 180 of vehicle 100, in response to reception of the stop control signal.

[Variations]

(1) In the embodiment described above, as indicated in S101 to S103 of FIG. 4, at the predetermined time point while vehicle 100 is parked, controller 181 of navigation device 180 of vehicle 100 transmits the position information of vehicle 100 detected by position detector 189 to server 200. However, instead of the above configuration, mobile terminal 400 of the user of vehicle 100 may include a position detector which is the same as position detector 189 of vehicle 100. Then, when controller 410 of mobile terminal 400 senses parking of vehicle 100, controller 410 may consider position information detected by the position detector as the position information of vehicle 100 while it is parked, and transmit the position information to server 200. Such a function may be provided as one function of the above application program incorporated into mobile terminal 400.

Whether or not parking of vehicle 100 is sensed may be determined, for example, based on whether or not communication can be established between short-distance wireless communication devices provided to mobile terminal 400 and navigation device 180. These short-distance wireless communication devices may adopt any communication method which allows communication in a range of several meters. For example, Bluetooth (registered trademark) or wireless LAN (Local Area Network) may be adopted. In this case, the position information detected by the position detector of mobile terminal 400 when communication between the short-distance wireless communication devices fails (or when the position of mobile terminal 400 several seconds before the failure does not change) may be considered as the position information of vehicle 100 while it is parked.

In addition, when a navigation function is performed in mobile terminal 400, the position information detected by the position detector of mobile terminal 400 when vehicle 100 arrives at a destination may be considered as the position information of vehicle 100 while it is parked.

(2) The processing on the vehicle 100 side illustrated in FIG. 4 described above is performed by controller 181 of navigation device 180. However, the present disclosure is not limited thereto, and the processing may be performed by another device of vehicle 100, for example, controller 111 of control device 110. In this case, instead of operation device 183 and notification device 184 of navigation device 180, vehicle 100 may include another operation device and another notification device, and an operation may be accepted by the other operation device and information may be notified by the other notification device.

(3) In FIG. 4 described above, whether or not an action on vehicle 100 is an abnormal action is determined by vehicle 100, as indicated in S106. However, the present disclosure is not limited thereto, and an action on vehicle 100 may be transmitted to server 200, and whether or not the action is an abnormal action may be determined by server 200.

(4) In the processing illustrated in FIG. 4 described above, whether or not the abnormal action occurs is always monitored while the vehicle is parked, as indicated in S101 and S104 to S108. However, the present disclosure is not limited thereto, and whether or not the abnormal action occurs may be monitored at a predetermined interval (for example, every minute) while the vehicle is parked.

(5) Only a user who has performed user registration beforehand is allowed to obtain the information on the occurrence of the abnormal action on vehicle 100 as illustrated in FIG. 4 described above. In this case, when the user performs user registration, the application program for the abnormality-related vehicle-side processing shown in FIG. 4 is downloaded from server 200 to vehicle 100 via communication device 130, and is stored in storage 182 of navigation device 180 of vehicle 100. Further, an application program for the abnormality-related terminal-side processing shown in FIG. 6 is downloaded from server 200 to mobile terminal 400 via wireless communication device 470, and is stored in storage 420. Thereby, the position information of vehicle 100 used to allow other vehicle 100 to shoot the image of vehicle 100 is transmitted to server 200, and in return, the user can obtain the notice information that the abnormal action occurs as indicated in S215 of FIG. 4, at mobile terminal 400.

(6) In the embodiment described above, the processing shown in FIG. 4 is implemented when software is executed by controllers 181 and 210. However, the present disclosure is not limited thereto, and the processing shown in FIG. 4 may be partly or entirely implemented by a dedicated hardware circuit.

(7) In the embodiment described above, the disclosure has been described as abnormal action information providing system 10. However, the present disclosure is not limited thereto, and the disclosure can be considered as a method for providing abnormal action information performed by abnormal action information providing system 10. The disclosure can also be considered as a device such as vehicle 100, server 200, or mobile terminal 400 included in abnormal action information providing system 10. Further, the disclosure can be considered as a method or a program performing processing as shown in FIG. 4 or 5 in vehicle 100, server 200, or mobile terminal 400.

In addition, the disclosure can be considered as computer-readable recording medium 251, 451 which records the program. This recording medium 251, 451 may be a medium which stationarily carries a program, including a magnetic tape, a magnetic disk such as a flexible disk or a hard disk, an optical disk such as a CD-ROM, a CD-R, a CD-RW, a DVD-ROM, a DVD-R, a DVD-RW, a DVD-RAM, a DVD+R, or a DVD+RW, a magneto-optical disk such as an MO, a memory card, a USB memory, or the like, or may be a medium which fluidly carries a program such that the program is downloaded from a server such as an ASP (Application Service Provider) via the communication network. In particular, in vehicle 100 not equipped with external storage device 250, 450, a computer-readable recording medium which records the program may be a medium which fluidly carries a program as described above.

(8) The techniques described in the embodiment and the variations are intended to be performed alone or in combination, as far as possible.

[Effects Obtained by Present Disclosure]

(1) As shown in FIGS. 1 to 3, abnormal action information providing system 10 in accordance with the present disclosure includes the plurality of vehicles 100, mobile terminal 400 of a user of one of the plurality of vehicles 100, and server 200 configured to communicate with vehicles 100 and mobile terminal 400. As shown in FIG. 2, each vehicle 100 includes position detector 189 configured to detect a position of the vehicle, various sensors 160 configured to detect an action on the vehicle, vehicle-mounted camera 170 configured to shoot an image around the vehicle, and controller 181. As shown in FIG. 2, server 200 includes controller 210 and storage 220. As shown in FIG. 3, each mobile terminal 400 includes controller 410 and output interface 440 configured to notify predetermined information.

As indicated in S103 of FIG. 4, controller 181 transmits position information of the vehicle detected by position detector 189 and a vehicle ID of the vehicle to server 200. As indicated in S201 and S202 of FIG. 4, controller 210 of server 200 causes storage 220 to store the vehicle ID and the position information of vehicle 100 which has transmitted these pieces of information, in an associated manner as a set of information.

As indicated in S104 and S106 to S108 of FIG. 4, controller 181 of vehicle 100 determines whether or not the action detected by various sensors 160 is an abnormal action that meets a predetermined condition. When controller 181 determines that the action is the abnormal action, controller 181 transmits, to server 200, abnormal action occurrence information including the position of the vehicle detected by position detector 189.

As indicated in S212 and S213 of FIG. 4, controller 210 of server 200 determines whether or not there is another vehicle 100 that can shoot an image of vehicle 100 at the position included in the occurrence information received from vehicle 100 with vehicle-mounted camera 170, using the position information stored in storage 220. When controller 210 determines that there is other vehicle 100, controller 210 transmits, to other vehicle 100, an instruction to shoot the image of vehicle 100 with vehicle-mounted camera 170.

As indicated in S111 to S113 of FIG. 4, controller 181 of other vehicle 100 controls vehicle-mounted camera 170 to shoot the image of vehicle 100 and transmits the shot image to server 200, according to the instruction from server 200.

As indicated in S215 of FIG. 4, when controller 210 of server 200 receives the image from other vehicle 100, controller 210 transmits notice information that the abnormal action occurs in vehicle 100, including the image, to mobile terminal 400 of the user of vehicle 100.

As indicated in S401 and S402 of FIG. 6, controller 410 of mobile terminal 400 controls output interface 440 to notify the image of vehicle 100, in addition to information that the abnormal action occurs in vehicle 100 of the user, according to the notice information received from server 200.

Thereby, when an abnormal action occurs in vehicle 100 of the user, in addition to information on such a fact, the user is notified of the image of vehicle 100 shot when the abnormal action occurs. By observing this image, the user can determine whether or not the occurrence of the abnormal action on vehicle 100 is erroneous information. As a result, it is possible to prevent erroneously determining that an abnormal action occurs in vehicle 100.

(2) As indicated in S215 of FIG. 4, when controller 210 of server 200 receives the occurrence information from a plurality of vehicles 100 within a predetermined range, controller 210 transmits such a fact, in addition to the notice information.

Thereby, the user is notified of occurrence of abnormal actions from the plurality of vehicles 100 within the predetermined range from vehicle 100 of the user. Thus, when a plurality of similar abnormal actions occur within the predetermined range, the user can consider the possibility of erroneous sensing due to vibration over a wide range resulting from fireworks in a fireworks display or the like. As a result, it is possible to further prevent erroneously determining that an abnormal action occurs in vehicle 100.

(3) As indicated in S214 and S215 of FIG. 4, controller 210 of server 200 retrieves information indicating occurrence of a predetermined phenomenon which is statistically highly likely to be erroneously determined by controller 181 of vehicle 100 that a predetermined condition is met, when compared with other phenomena. Controller 210 transmits, to mobile terminal 400 of the user of vehicle 100 parked within a range in which the retrieved predetermined phenomenon causes an erroneous determination that the predetermined condition is met, a fact that there is a high likelihood of an erroneous determination, in addition to the notice information.

Thereby, the user is notified of the fact that there occurs the predetermined phenomenon which is highly likely to be erroneously determined that an abnormal action occurs, within the range in which the phenomenon has influence on vehicle 100. As a result, it is possible to further prevent erroneously determining that an abnormal action occurs in vehicle 100.

(4) As indicated in S104 to S108 of FIG. 4, controller 181 of vehicle 100 controls vehicle-mounted camera 170 to shoot a surrounding image of vehicle 100, and when controller 181 determines that the detected action is the abnormal action, controller 181 transmits the shot surrounding image to server 200. As indicated in S215 of FIG. 4, controller 210 of server 200 transmits the surrounding image received from vehicle 100, in addition to the notice information.

Thereby, the user is notified of the surrounding image of vehicle 100 of the user when it is considered that the abnormal action occurs. As a result, it is possible to further prevent erroneously determining that an abnormal action occurs in vehicle 100.

Although the embodiment of the present disclosure has been described, it should be understood that the embodiment disclosed herein is illustrative and non-restrictive in every respect. The scope of the present disclosure is defined by the scope of the claims, and is intended to include any modifications within the scope and meaning equivalent to the scope of the claims.

What is claimed is:

1. An information providing system comprising:
    a plurality of vehicles;
    a mobile terminal of a user of one of the plurality of vehicles; and
    a server configured to communicate with the plurality of vehicles and the mobile terminal,
    the server including a controller and a storage,
    the controller being configured to
        cause the storage to store identification information of each vehicle and a position of each vehicle as a set of information,
        specify, based on position information of an abnormality occurring vehicle which is a vehicle that has transmitted information of an abnormality occurrence to the server, an image-shooting vehicle which is a vehicle that can shoot an image of the abnormality occurring vehicle with a camera, using position information stored in the storage, without causing activation of a vehicular alarm of the abnormality occurring vehicle,
        transmit, to the image-shooting vehicle, an instruction to shoot an image of the abnormality occurring vehicle with the camera mounted in the image-shooting vehicle,
        transmit the image shot by the image-shooting vehicle to a mobile terminal of a user of the abnormality occurring vehicle, as a description of the abnormality occurrence occurring in the abnormality occurring vehicle,
        retrieve information indicating occurrence of a predetermined phenomenon which is substantially associated with an erroneous determination of the abnormality occurrence, when compared with other phenomena, and
        transmit, to the mobile terminal of the user of the abnormality occurring vehicle parked within a range in which the retrieved predetermined phenomenon causes the erroneous determination of the abnormality occurrence, a fact that there is a high likelihood of the erroneous determination of the abnormality occurrence, in addition to the image.

2. The information providing system according to claim 1, wherein
    when the controller receives the information of the abnormality occurrence from at least one of other vehicles within a predetermined range of the plurality of vehicles, the controller is configured to transmit such a fact, in addition to the image, to the mobile terminal of the user of the abnormality occurring vehicle.

3. The information providing system according to claim 1, wherein the controller is configured to transmit, to the mobile terminal of the user of the abnormality occurring vehicle, a surrounding image shot by the abnormality occurring vehicle, in addition to the image shot by the image-shooting vehicle.

4. A vehicle comprising:
    an action detector configured to detect an action on the vehicle;
    a camera configured to shoot an image around the vehicle; and
    a controller,
    the controller being configured to
        transmit position information of the vehicle and identification information of the vehicle to a server to be stored therein,
        determine whether or not the action detected by the action detector is an abnormal action that meets a predetermined condition, and
        when determining that the action is the abnormal action, transmit information of an abnormality occurrence including a position of the vehicle to the server, without causing activation of an alarm,
        control the camera to shoot an image of a second vehicle, according to an image-shooting instruction from the server to the vehicle, the server having determined that the vehicle can shoot the image of the second vehicle with the camera, using the position information of the vehicle stored in the server,
        transmit the shot image to the server to transmit the image to a mobile terminal of a user of the second vehicle, as a description of the abnormality occurring in the second vehicle,
        retrieve information indicating occurrence of a predetermined phenomenon which is substantially associated with an erroneous determination of the abnormality occurrence, when compared with other phenomena, and
        transmit, to the mobile terminal of the user of the second vehicle parked with a range in which the retrieved predetermined phenomenon causes the erroneous determination of the abnormality occurrence, a fact that there is a high likelihood of the erroneous determination of the abnormality occurrence, in addition to the shot image.

* * * * *